Oct. 18, 1932.                H. E. IVES                 1,883,291
                    PROJECTION OF STEREOSCOPIC PICTURES
                       Filed Oct. 29, 1930        2 Sheets-Sheet 1
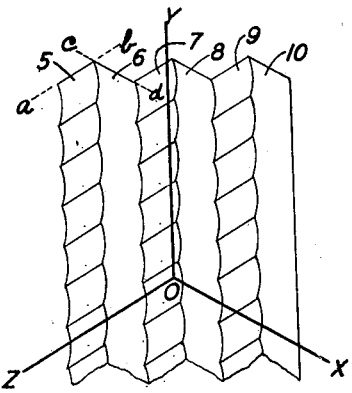
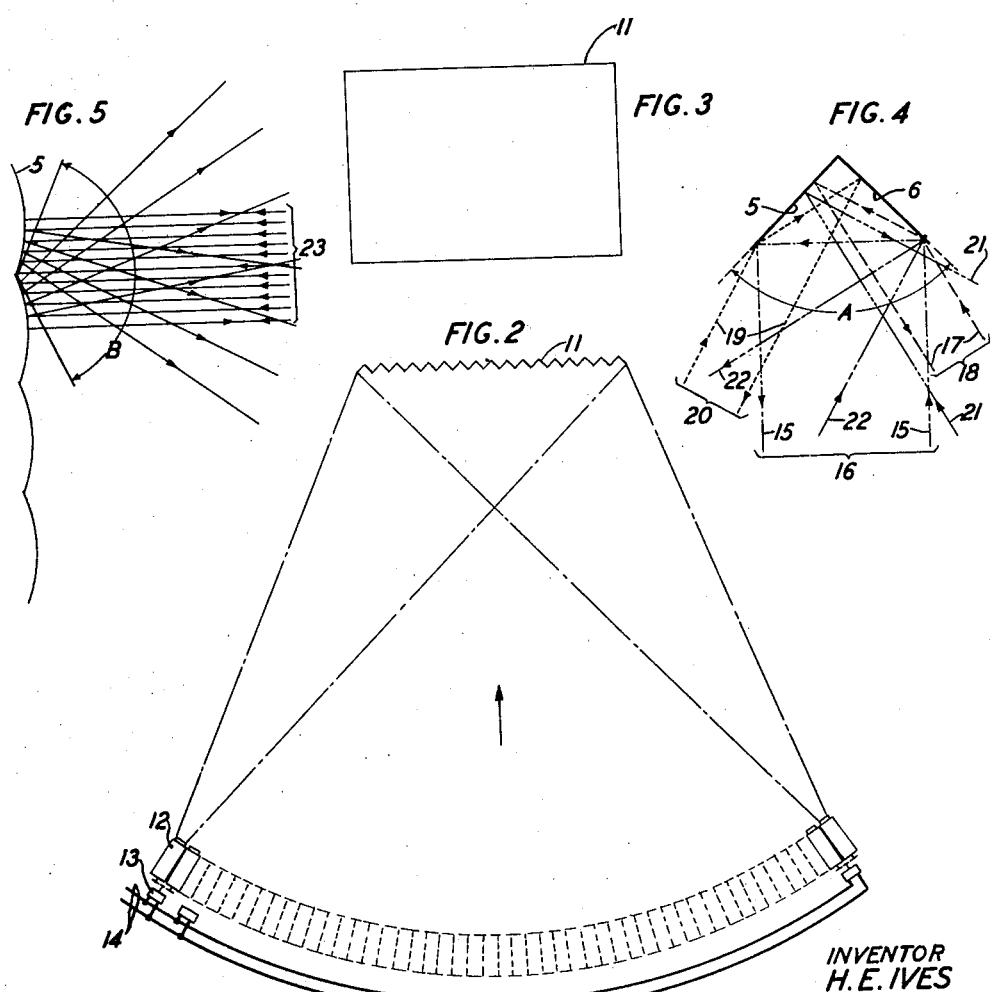
INVENTOR
H. E. IVES
BY
Stanley B. Kent
ATTORNEY Oct. 18, 1932.  H. E. IVES  1,883,291
PROJECTION OF STEREOSCOPIC PICTURES
Filed Oct. 29, 1930  2 Sheets-Sheet 2
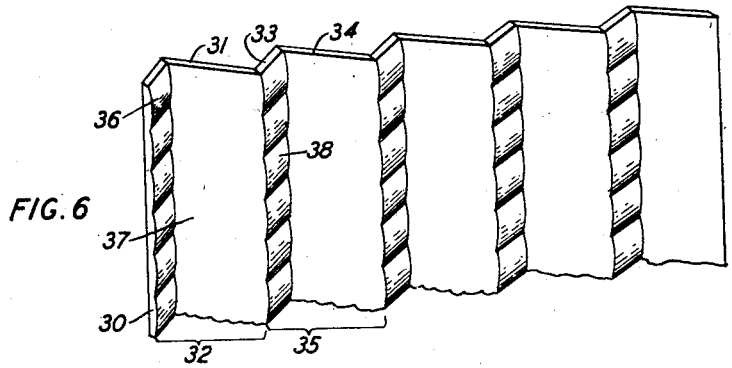
FIG. 6
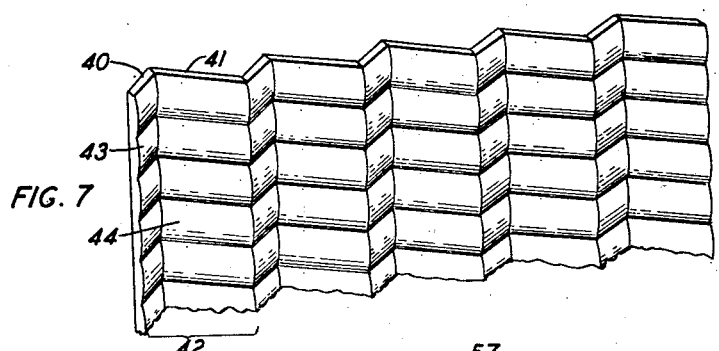
FIG. 7
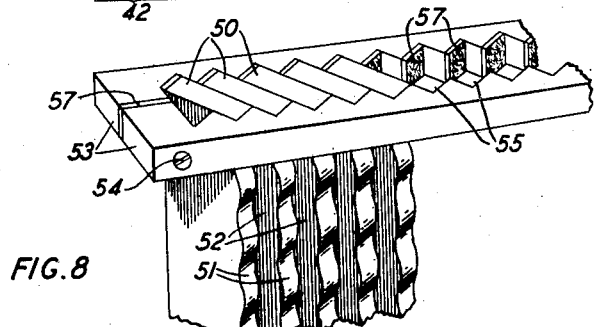
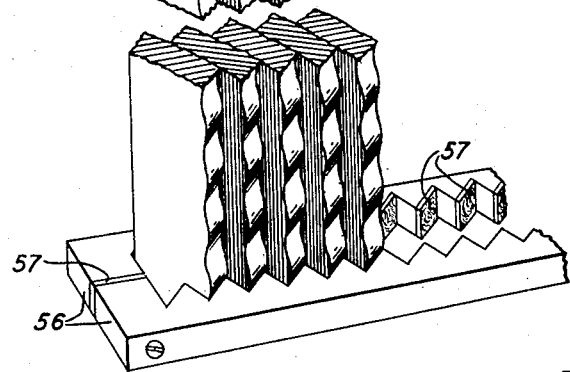
FIG. 8
INVENTOR
H. E. IVES
BY
Stanley B. Kent.
ATTORNEY Patented Oct. 18, 1932

1,883,291

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

PROJECTION OF STEREOSCOPIC PICTURES

Application filed October 29, 1930. Serial No. 491,831.

This invention relates to the producing of pictures in stereoscopic relief.

An object of the invention is to provide an improved arrangement for projecting stereoscopic pictures in such a manner that the stereoscopic effect is present when the projected pictures are viewed at different angles and different distances without the use of any instruments at the observer's eye.

The invention is applicable to either still or motion pictures.

This invention is partly in the nature of an improvement over certain of the features disclosed in a copending application of H. E. Ives Serial No. 338,642, filed February 9, 1929. In that application a number of arrangements for taking and projecting motion pictures having the characteristics of the parallax panoramagram are described. In one arrangement a large number of separate motion picture cameras, for example fifty, are set up side by side and all directed to the same object. These cameras are very narrow so that the lenses are in practically juxtaposed position. A complete series of views of the object from all necessary directions is thus taken and forms a record of the moving objects in the form of a large number of motion picture films. To project from this record there may be set up in place of the original cameras a corresponding number of motion picture projectors all directed to the same translucent screen which is viewed from the side opposite the projector. A short distance behind the screen and between it and the projector is placed an opaque line grating of the parallax panoramagram type, by virtue of which the screen picture produced by each projector is cut up into narrow adjacent strips. Near the screen and between it and the observer is placed a second similar grating through which the observer sees the picture in relief.

In another copending application of H. E. Ives, Serial No. 490,637, filed on October 23, 1930, there is disclosed and claimed a projecting system employing a lenticular diffusing grating or screen in place of the opaque line grating and translucent screen above mentioned. In one arrangement the screen used consists of a transparent refracting medium provided on its front and back faces with opposed cylindrical surfaces of such radius that the front ridges focus parallel rays incident in any direction sharply upon the rear ridged surfaces, the rear surfaces being treated to cause diffusion of the light rays. A battery of juxtaposed motion picture projectors arranged in an arc of a circle about the screen project motion pictures on the front ridges of the screen. However, by using wide angle lenses in the projectors toward the sides as required, they may be arranged in a straight line parallel to the screen to effect improved definition. The projected picture corresponds to the aspects of the object as viewed from a similar bank of taking cameras pointing toward the object. Each rear ridged surface is thus illuminated in as many parallel strips of light as there are projectors. If the rear surface is diffusing and opaque a moving picture in relief may be seen by viewing the screen from the front in any plane except the plane of the projecting light beams.

A feature of the present invention is a screen in which the paths of the light rays are determined entirely by reflection without the interposition of refracting media. A plurality of images are projected upon the screen each from a different direction in the same manner as that employed in the systems hereinbefore mentioned. The screen comprises a plurality of elongated reflecting elements arranged side by side each element having the property, solely by reason of reflection, of reflecting light back upon its source. In the normal manner of viewing pictures the elements are elongated in the vertical direction and each element has the property of reflecting light back upon its source in the horizontal direction, while it has the further property of diffusing the light in a vertical direction.

One typical example of such a reflecting screen is made up of a plurality of vertically positioned strips having reflecting surfaces, the strips being arranged side by side. Each element of the screen consists of two adjacent strips whose surfaces are placed at right angles to each other. One of the surfaces is provided with a unilateral diffusing structure such that incident light beams are diffused only in vertical planes. Two mirrors at right angles to each other constitute a well known optical arrangement for returning a beam of light upon itself. Each element of this typical screen is a modification of such a mirror system in which the incident beam is reflected back upon its source in the horizontal direction but is diffused in the vertical direction. The unilateral diffusing structure is merely a series of horizontal ribs which reflect and diffract the incident light upward and downward without altering the direction of regular reflection in the horizontal plane. This screen is built up of vertical strips of ribbed glass whose sides are ground accurately at right angles to the ribbed face. A series of such strips silvered and polished on the ribbed and plane sides are stacked against each other to form strips standing at 45° to the plane of the screen as a whole. Light striking either inside face of the V-shaped elements thus formed is reflected to the other face and so back toward the projector experiencing at one reflecting face or the other diffusion in the vertical direction.

Screens according to this invention may be made up in other ways. The shapes and locations of the surfaces may be described with reference to the rectangular coordinates of solid analytical geometry. If one surface of an element coincides with a surface generated by a moving straight line which at all times is parallel to the OX axis, then the other surface of the same element coincides with a surface generated by a moving straight line, which at all times is parallel say to the OZ axis. These surfaces are then at right angles to each other. They must be so shaped that an elemental beam of parallel rays of light incident on one surface is reflected to the other and diffused in planes parallel to the OY axis. The angle within which diffusion occurs determines the viewing range and may be varied as conditions require. The essential requirements of the reflecting surfaces are thus defined without reference to their positions with respect to other material objects.

The invention will now be described more in detail having reference to the accompanying drawings.

Fig. 1 shows the relative positions of the reflecting surfaces with respect to a set of coordinate axes.

Fig. 2 is an arrangement for projecting and viewing motion pictures in relief using a plurality of motion picture films, each film taken from a different direction with respect to the object.

Fig. 3 is a front view of the screen as it appears to an observer.

Fig. 4 illustrates reflection of light from mirror surfaces at right angles.

Fig. 5 shows a diffusing surface according to this invention.

Fig. 6 shows a fragment of a screen consisting of reflecting surfaces at right angles, one of which has cylindrical ridges for unilaterally diffusing light.

Fig. 7 is a fragment of a screen consisting of reflecting surfaces at right angles, both of which are ribbed to unilaterally diffuse light; and Fig. 8 shows details of a screen comprising strips of glass having parallel sides and a ribbed edge.

Referring now to Fig. 1, coordinate planes XOY, ZOY and ZOX are at right angles to each other anywhere in space and intersect in the coordinate axes OX, OY and OZ.

A screen according to the present invention is composed of a large number of pairs of reflecting mirror-like surfaces positioned in a definite manner with respect to one another. The positions of these surfaces may be described by reference to the coordinate axes. In Fig. 1 surfaces 5, 6, 7, 8, 9 and 10 are a few of such representative surfaces.

Surface 5 coincides with one generated by a straight line such as line $a—b$ moving in such a way that it is always parallel to the OZ axis. As shown, this surface consists of adjacent sections of circular cylindrical surfaces. Surface 5 as a whole is a cylindrical surface in the geometrical sense, that is, a curved surface generated by a straight line constantly parallel to a given line. The limiting form of cylindrical surface is a plane surface, which results when the generating line always intersects a straight line. Surface 6 likewise coincides with one generated by a straight line such as line $c—d$ moving in such a way that it is always parallel to the OX axis. As shown, this surface is a plane surface. The surfaces 5 and 6 are mirror-like and together form a reflecting element which has the property of reflecting adjacent rays of a beam of light lying in a plane parallel to the OY axis so that all the reflected rays lie in planes parallel to the plane of the incident rays but diffused within said plane of the reflected ray. Surfaces 7 and 8 constitute another element having the same property as surfaces 5 and 6. Surfaces 9 and 10 constitute still another element.

In a complete viewing screen, enough elements are used to give the required amount of detail in the observed image. The arrangement of Fig. 2 provides for viewing an image in relief from any one of a large number of positions in front of a screen 11 provided with a large number of mirror-like reflecting elements. For simplicity in illustration the number of elements shown in Fig.

2 is much smaller than the number which would be used in any actual installation. A plurality of projectors 12 are arranged in the arc of a circle with the screen 11 at the center. In this figure, 50 projectors are shown but this number is chosen as being merely representative and corresponds to the number of cameras used in the taking of the original set of films as disclosed in the Ives application first mentioned. The film used in each of these projectors is a motion picture film obtained by photographing the object with a motion picture camera located relatively to the object in the same position as the projector occupies with respect to the screen 11. In taking, the films are driven through the camera by any suitable means such that they are operated synchronously. For projection they are driven through the projector by similar means such that they are projected synchronously. As shown, motor 13 drives the first pair of cameras 12 and the succeeding pairs are driven by similar motors. These motors are all energized from the same source of alternating current supplied to the line 14. It will be seen that when these projectors are in operation, each will produce a series of images at the screen 11, each of which series will show the aspect of the object from a different point of view. These projectors are the type disclosed in the Ives application supra and are much like the projectors ordinarily employed in projecting motion pictures, but are preferably much narrower, so that the diameter of the projector lens is nearly as great as the width of the projector.

In order to improve the definition, the projectors may be arranged in a straight line parallel to the screen, the optical axis of each projector being normal to the screen and the lenses having such an angle width that the image is focused on the screen in the proper position. The extreme projectors would require the widest angle lenses.

The screen is viewed from the side on which the images are projected as indicated by the arrow. The screen 11 as seen by an observer would appear as shown in Fig. 3. The reflecting elements would be indistinguishable as separate elements for best results. The width of each element is determined solely by the degree of resolution desired in the image. The screen elements divide the beam of light from each projector into elemental sections upon reflection from which sections the images are built up for the observer.

In order to simplify the succeeding detailed description the ZOX coordinate plane will be considered to be a horizontal plane. It follows that planes parallel to the OY axis are then vertical planes.

Fig. 4 illustrates the reflection of light from various directions incident upon any reflecting element such as surfaces 5 and 6 of Fig. 1. The paths shown are projections of the actual paths of the rays upon the ZOX coordinate plane. Ray 15 projected from directly in front of the element 5, 6, strikes surface 6, is reflected therefrom to surface 5 and finally is reflected from surface 5 in a path parallel to its original path but in the opposite direction, as shown by the arrow heads. All of the rays parallel to ray 15 and incident on either surface 5 or 6 are reflected back in parallel paths. These rays form an elemental beam 16. Beam 17 incident from a position to the right is reflected back and together with other rays incident from the same direction forms elemental beam 18. Likewise, ray 19 incident from a position from the left is reflected back and with other rays from the same direction forms elemental beam 20. Similar reflection occurs for all rays incident within the angle A. From Fig. 4 it is clear that except for a very small space in front of the element 5, 6 which space is too small to be occupied by an observer, reflected light can be observed only when both the observer and the projector are located within the same vertical elemental strip of space. Rays such as 21 and 22 which experience reflection from one surface only are wasted but cause no confusion because they are reflected outside the useful angle A. In order to compensate for the reduced cross-sectional area of the elemental beams when the direction of projection is farther and farther from the normal to the screen as a whole, the intensity of the projector light sources may be graded, the extreme projectors being provided with the most intense sources.

By reason of the shape of the cylindrical surface 5, the reflected useful elemental beams, such as 16, 18 and 20, are diffused in vertical planes as illustrated in Fig. 5. The curved portions of the surface 5 are sections of circular cylindrical surfaces, the axes of which lie in a vertical plane, are parallel to one another, and are separated by a distance less than the diameter of the circular cylindrical surfaces. The elemental bundle 23 of parallel rays of light incident upon the surface 5 are diffused in vertical planes through the angle B as indicated by the lines with arrows pointing away from the surface 5. An observer located anywhere within the vertical elemental strip of space occupied by the projected beam and within the boundaries of the angle B will be able to observe rays from the elemental beam.

From the foregoing description it is clear that an observer looking at the screen 11 of Fig. 2 from the side toward the projector will see with one eye only the image projected by the projector which is in the same vertical plane as that eye. The image seen by the other eye will be that projected by another projector which is in the same vertical plane as the other eye. Providing the images projected by the several projectors properly represent the aspects of the object as viewed from the same direction, in the manner hereinbefore set forth, the images seen by the two eyes will be different and will be interpreted by the observer as an image in relief.

Figs. 6, 7 and 8 are fragments of three types of screens according to this invention and show the manner in which they would appear to an observer located in the left-hand side of the balcony of a theatre and provided with a telescope to make visible the surface structure of the screen. An ordinary observer interested only in seeing images in relief would be unable to see the surface structure. The screen would appear to him like any ordinary viewing screen. At least it would appear sufficiently structureless to give the desired degree of resolution in the produced image.

The screen of Fig. 6 is made up of strips of solid material, one surface of each strip being mirror-like. Strips 30 and 31 constitute one reflecting element 32, strips 33 and 34 an adjacent element 35. Surface 36 of strip 30 is provided with transverse ridges, each ridge conforming to a sector of a circular cylindrical surface, the axes of the several sectors being parallel and separated by a distance less than the diameter of the circular cylindrical surfaces. Surface 37 is a plane surface. The strips 30 and 31 are positioned so that the surfaces 36 and 37 are at right angles to and facing one another. Surfaces of element 35 and of each of the other elements are arranged in the same way. Strips 31 and 33 are likewise at right angles to one another but the surfaces 37 and 38 are on the outside of the V-shaped ridge thus formed. The strips may be held in position in any suitable manner. They may be made of glass with the surfaces such as 36 and 37 silvered and polished to constitute reflecting surfaces.

The screen of Fig. 7 is identical with that of Fig. 6, except that both faces of element 42 are provided with circular cylindrical ridges. Both strips 40 and 41 with the corresponding surfaces 43 and 44 are identical with strip 30 of Fig. 6.

The screen of Fig. 8 consists of a plurality of strips of glass 50. One edge of each strip is ribbed or corrugated and the plane sides are ground accurately at right angles to the ribbed face. A large number of these strips, silvered and polished on the ribbed and plane surfaces, are laid side by side, plane side against plane side, the ribbed edges 51 being offset to expose a portion 52 of the silvered plane side surface of each strip. The strips are held in place at top by supports 53 suitably held together, as by bolts 54. Supports 53 are provided with right angled V-shaped notches 55 to hold the glass strips in their proper relative positions. Similar supports 56 hold the lower ends of the glass strips in position. The rear portions of supports 53 and 56 are provided with pads 57 of yielding material, such as felt, to compensate for inequalities in the depth of the strips. The corrugations on surfaces 51 are shown relatively large to simplify the drawing. In actual construction these are made much finer to enhance the diffusion in the vertical direction.

Care must be exercised to insure that the reflecting faces are accurately at right angles to the plane sides.

It is obvious that other forms of screens may be constructed in accordance with the teachings hereinbefore set forth which come within the purview of this invention, the scope of which is defined by the appended claims.

What is claimed is:

1. A projection screen for producing images in relief, comprising a first set of mirror-like surfaces, each surface thereof coinciding with one generated by the movement of a straight line which at all times is parallel to the OX coordinate axis, a second set of mirror-like surfaces, each surface of said second set coinciding with one generated by the movement of a straight line which at all times is parallel to the OZ coordinate axis, said mirror-like surfaces being arranged adjacent each other and surfaces of one set alternating with surfaces of the other to form a plurality of elements each element comprising two facing mirror-like surfaces, at least one of said surfaces of each element being so shaped that an elemental beam of light reflected therefrom is diffused in planes parallel to the OY axis.

2. A projection screen for producing images in relief, comprising a first set of mirror-like surfaces, each surface thereof coinciding with one generated by the movement of a straight line which at all times is parallel to the OX coordinate axis, a second set of mirror-like surfaces, each surface of said second set coinciding with one generated by the movement of a straight line which at all times is parallel to the OZ coordinate axis, said mirror-like surfaces being arranged adjacent each other and surfaces of one set alternating with surfaces of the other to form a plurality of elements, each element comprising two facing mirror-like surfaces, said mirror-like surfaces being so shaped that an elemental beam of parallel rays of light incident thereon is diffusely reflected therefrom over an appreciable angle in planes parallel to the OY axis.

3. A projection screen for producing images in relief, comprising a first set of mirror-like surfaces, each surface thereof coinciding with one generated by the movement of a straight line which at all times is parallel to the OX coordinate axis, a second set of mirror-like surfaces, each surface of said second set coinciding with one generated by the movement of a straight line which at all times is parallel to the OZ coordinate axis, said mirror-like surfaces being arranged adjacent each other and surfaces of one set alternating with surfaces of the other to form a plurality of elements, each element comprising two facing mirror-like surfaces, at least one of said mirror-like surfaces being corrugated to diffuse light in planes parallel to the OY axis.

4. A projection screen for producing images in relief, comprising a reflecting surface coinciding with one generated by the movement of a straight line which at all times is parallel to the OX coordinate axis, a second reflecting surface coinciding with one generated by the movement of a straight line which at all times is parallel to the OZ coordinate axis, said surfaces being so positioned that a plurality of parallel adjacent rays of light lying in a plane parallel to the OY axis incident on one surface and reflected to the other are diffused in planes parallel to the OY axis.

5. A projection screen for producing images in relief, comprising an element having a plurality of parallel grooves on one surface, the side faces of each groove being so shaped that a plane intersecting the element transversely to the grooves intersects the faces in straight lines which are at right angles to each other, at least one of said faces being ribbed transversely to cause vertical diffusion, and means to render said faces light reflecting.

6. A projection screen for producing images in relief, comprising a plurality of strips of glass each strip having two parallel plane surfaces and a ribbed edge the ribs of which are at right angles to said plane surfaces, said strips being arranged side by side with plane surfaces in contact and the ribbed edges offset by approximately the thickness of a strip, and means to render said edges and exposed plane surfaces light reflecting.

7. A projection screen for producing images in relief, comprising a plurality of elongated reflecting elements arranged side by side, each element having a reflecting surface for reflecting an incident beam of light back upon itself, and means to cause diffusion of the reflected light in the lengthwise direction of the elongated reflecting elements.

8. A projection screen for producing images in relief, comprising a plurality of elongated reflecting elements arranged side by side, each element having a reflecting surface for reflecting a beam of light incident from any one of a plurality of positions around said elements back upon itself and diffusing light in a direction at right angles to said several positions.

9. A projection screen for producing images in relief, comprising an opaque reflecting body each element of which comprises two mirror-like surfaces positioned at right angles to each other for reflecting light incident on one to the other, one of said surfaces being unilaterally diffusing.

10. A projection screen for producing images in relief, comprising a plurality of elongated mirror-like surfaces arranged longitudinally side by side in pairs, the surfaces of each pair being suitably relatively positioned to reflect light incident upon one surface to the other surface of said pair, one surface at least of each pair consisting of sectors of circular cylindrical surfaces having axes transverse to the elongated surfaces and separated by distances at least as small as the diameter of the cylindrical surfaces.

11. A projection screen for producing images in relief, comprising a plurality of strips of mirror-like surfaces standing vertically and side by side, adjacent surfaces being at right angles to each other in horizontal cross section, at least one surface of each adjacent pair of surfaces being corrugated to diffusely reflect vertically adjacent parallel rays of light in vertical planes.

12. A projection screen for producing images in relief, comprising a plurality of strips of mirror-like surfaces standing vertically and side by side, adjacent surfaces being at right angles to each other in horizontal cross section, all of said surfaces being corrugated to diffusely reflect vertically adjacent parallel rays of light in vertical planes.

13. A projection screen for producing images in relief, comprising a plurality of vertically elongated reflecting elements arranged side by side, each element comprising a pair of reflecting surfaces at least one of which is ribbed in a horizontal direction, the surfaces of each pair being perpendicular to one another.

14. Apparatus for producing images in relief including a projection screen according to claim 3, comprising means to project a plurality of picture images on said screen, each image representing the object from a different point of view and being projected from the same relative direction from the screen as the taking camera occupied with respect to the object.

15. In apparatus for producing images in relief, a first set of mirror-like surfaces, each surface thereof coinciding with one generated by the movement of a straight line which at all times is parallel to the OX coordinate axis, a second set of mirror-like surfaces, each surface of said second set coinciding with one generated by the movement of a straight line which at all times is parallel to the OZ coordinate axis, said mirror-like surfaces being arranged adjacent each other and surfaces of one set alternating with surfaces of the other to form a viewing screen consisting of a plurality of elements, each element comprising two facing mirror-like surfaces, at least one of said surfaces of each element being corrugated so that an elemental beam of light reflected therefrom is diffused in planes parallel to the OY axis, and means to project elemental beams of nearly parallel rays of light upon said screen whereby each projected ray is reflected in a plane parallel to a plane including the projected ray and parallel to the OY axis.

16. Apparatus for producing images in relief including a projection screen according to claim 13, comprising means to project a plurality of motion picture images on said screen, each image representing the object from a different point of view and being projected from the same relative direction from the screen as the taking camera occupied with respect to the object.

In witness whereof, I hereunto subscribe my name this 27th day of October, 1930.

HERBERT E. IVES.